(12) United States Patent
Maehara et al.

(10) Patent No.: US 9,352,994 B2
(45) Date of Patent: May 31, 2016

(54) METHOD FOR VACUUM-DEGASSING MOLTEN GLASS, APPARATUS FOR VACUUM-DEGASSING MOLTEN GLASS, PROCESS FOR PRODUCING MOLTEN GLASS, APPARATUS FOR PRODUCING MOLTEN GLASS, PROCESS FOR PRODUCING GLASS PRODUCT, AND APPARATUS FOR PRODUCING GLASS PRODUCT

(71) Applicant: ASAHI GLASS COMPANY, LIMITED, Chiyoda-ku (JP)

(72) Inventors: Terutaka Maehara, Chiyoda-ku (JP); Rei Kitamura, Chiyoda-ku (JP); Shuji Kabashima, Chiyoda-ku (JP)

(73) Assignee: Asahi Glass Company Limited, Chiyoda-ku (JP)

( * ) Notice: Subject to any disclaimer, the term of this patent is extended or adjusted under 35 U.S.C. 154(b) by 172 days.

(21) Appl. No.: 14/053,037

(22) Filed: Oct. 14, 2013

(65) Prior Publication Data
US 2014/0033766 A1 Feb. 6, 2014

Related U.S. Application Data

(63) Continuation of application No. PCT/JP2012/059734, filed on Apr. 9, 2012.

(30) Foreign Application Priority Data

Apr. 12, 2011 (JP) ................................ 2011-088174

(51) Int. Cl.
*C03B 5/225* (2006.01)
(52) U.S. Cl.
CPC .................................. *C03B 5/2252* (2013.01)

(58) Field of Classification Search
None
See application file for complete search history.

(56) References Cited

U.S. PATENT DOCUMENTS

2009/0000335 A1* 1/2009 Urata et al. ................ 65/134.2
2010/0251772 A1* 10/2010 Itoh et al. .................... 65/32.1

FOREIGN PATENT DOCUMENTS

DE 200 22 727 U1 2/2002
EP 2 272 806 A1 1/2011
(Continued)

OTHER PUBLICATIONS

Extended European Search Report issued Nov. 17, 2014 in Patent Application No. 12770966.5.
(Continued)

*Primary Examiner* — Lisa Herring
(74) *Attorney, Agent, or Firm* — Oblon, McClelland, Maier & Neustadt, L.L.P.

(57) ABSTRACT

To provide a vacuum-degassing method and a vacuum degassing apparatus excellent in the effect of vacuum-degassing molten glass, more specifically, a method for vacuum-degassing molten glass and a vacuum degassing apparatus, capable of effectively suppressing formation of reboil bubbles.
A method for vacuum-degassing molten glass, which comprises melting glass materials to be silicate glass and passing the resulting molten glass in a flow passage in a vacuum degassing vessel, the interior of which is maintained in a reduced pressure state, to vacuum-degas the molten glass, wherein vacuum-degassing is carried out under conditions satisfying the following formula (1) at a bottom portion of the vacuum degassing vessel:

$$SS = pSO_2/P_{abs} < 2.0 \qquad (1)$$

wherein SS is the supersaturation degree of $SO_2$ in the molten glass, $pSO_2$ is the partial pressure (Pa) of $SO_2$, and $P_{abs}$ is the pressure (Pa) at the bottom portion of the glass flow passage of the vacuum degassing vessel.

9 Claims, 5 Drawing Sheets

(56) References Cited

FOREIGN PATENT DOCUMENTS

| JP | 11-255519 | 9/1999 |
| JP | 2006-265001 | 10/2006 |
| JP | 2006-298657 A | 11/2006 |
| WO | 2006/080444 | 8/2006 |
| WO | 2007/111079 | 10/2007 |

OTHER PUBLICATIONS

International Search Report issued Jul. 3, 2012 in PCT/JP2012/059734 filed Apr. 9, 2012.

* cited by examiner

METHOD FOR VACUUM-DEGASSING MOLTEN GLASS, APPARATUS FOR VACUUM-DEGASSING MOLTEN GLASS, PROCESS FOR PRODUCING MOLTEN GLASS, APPARATUS FOR PRODUCING MOLTEN GLASS, PROCESS FOR PRODUCING GLASS PRODUCT, AND APPARATUS FOR PRODUCING GLASS PRODUCT

TECHNICAL FIELD

The present invention relates to a method for vacuum-degassing molten glass, an apparatus for vacuum-degassing molten glass, a process for producing molten glass, an apparatus for producing molten glass, a process for producing a glass product, and an apparatus for producing a glass product.

BACKGROUND ART

Heretofore, in order to improve the quality of glass products, a refining step of removing bubbles formed in molten glass is carried out prior to forming in a forming apparatus of molten glass formed by melting glass materials in a melting tank.

As the refining step, a method has been known wherein a refining agent such as sodium sulfate ($Na_2SO_4$) is preliminarily blended with the materials, and molten glass obtained by melting the materials is stored and held at a predetermined temperature for a certain time, whereby bubbles in the molten glass are made to grow and float up by the refining agent and are removed. Further, a vacuum degassing method has also been known wherein molten glass is passed through a vacuum degassing vessel, the interior of which is maintained in a predetermined degree of vacuum, whereby bubbles included in the molten glass are made to grow in a relatively short time, and the bubbles are made to float up to the surface of the molten glass employing buoyancy of the grown bubbles, and the bubbles are broken at the surface of the molten glass, whereby the bubbles are removed from the molten glass.

In order to efficiently remove the bubbles from the molten glass, it is preferred to carry out the above two methods in combination, that is, to carry out the vacuum-degassing method using molten glass having a refining agent added thereto.

In order to effectively and securely remove the bubbles in molten glass, a process is necessary such that the bubbles are made to grow in the molten glass and float up to the molten glass surface and are broken, and in order to carry out such a process securely and effectively, it is required to maintain the degree of vacuum in the vacuum-degassing vessel within an appropriate range.

In order to effectively remove bubbles from molten glass, it is necessary that gas components dissolved in the molten glass enter into the bubbles, whereby the bubbles continuously grow. In order to cause such a phenomenon that bubbles continuously grow, it is necessary to reduce the pressure to a pressure of at most a certain threshold pressure. Gas components greatly contribute to growth of the bubbles in the vacuum-degassing step, are $H_2O$ gas formed from moisture in the molten glass and $SO_2$ gas formed by decomposition of $SO_3$ dissolved in the molten glass. Thus, the present applicant has disclosed that the bubbles in the molten glass can effectively be removed by adjusting the pressure in the vacuum degassing vessel to be lower than the bubble growth starting pressure determined by the moisture concentration (β-OH value) in the glass, the $SO_3$ concentration and the temperature of the molten glass (Patent Document 1).

It has been known that in molten glass after melting or after refinement, bubbles form also at the interface between the molten glass and platinum or bricks as a structure (Patent Document 2). Patent Document 2 discloses that formation of bubbles can be suppressed by defining the content of $SO_3$ in the molten glass within a predetermined range.

PRIOR ART DOCUMENTS

Patent Documents

Patent Document 1: WO2007/111079
Patent Document 2: JP-A-2006-265001

DISCLOSURE OF INVENTION

Technical Problem

In order to improve the vacuum degassing effect, it is considered to reduce the pressure in the vacuum degassing vessel as far as possible to make bubbles grow and to increase the floating speed. However, even when the pressure in the vacuum degassing vessel is reduced as far as possible, bubbles in a glass product cannot satisfactorily be removed in some cases.

Further, although Patent Document 2 discloses the bubbles, it failed to disclose the relation between the bubbles and the vacuum-degassing step.

Under these circumstances, the object of the present invention is to provide a vacuum-degassing method and a vacuum degassing apparatus, which are excellent in the effect of vacuum-degassing molten glass.

Further, the object of the present invention is to provide a process for producing molten glass and a process for producing a glass product, employing the above vacuum-degassing method, and an apparatus for producing molten glass and an apparatus for producing a glass product, employing the above vacuum degassing apparatus.

Solution to Problem

The present inventors have conducted extensive studies and as a result, found that when the pressure in a vacuum degassing vessel is made extremely low, although bubbles in molten glass can be removed as expected, other bubbles form at the interface between the furnace material of the vacuum degassing vessel and the molten glass. Hereinafter, such bubbles formed in the vacuum degassing vessel will be referred to as reboil bubbles, and such a phenomenon will be referred to as reboiling. Here, commonly used wordings "reboiling" and "reboil bubbles" are not specified by the causes and the location where they occur, specifically, whether they occur in the molten glass or at the interface between the molten glass and the furnace material. However, the wordings here mean the above-described narrowly-defined wordings limited to bubbles in the vacuum degassing vessel.

Further, the reason why bubbles remain in a glass product even through the pressure is reduced has been unclear for a long period, however, the present inventors have found that if reboil bubbles form in a downstream region of the vacuum degassing vessel, since the time during which the molten glass is exposed to a vacuum is short and the vacuum degassing effect tends to be small, the reboil bubbles are sent out of the vacuum degassing vessel together with the molten glass, whereby the molten glass includes bubbles, and the bubbles remain in a glass product.

Further, based on the above findings, the present inventors have conducted extensive studies on a vacuum-degassing method capable of suppressing formation of new bubbles by reboiling while effectively removing the bubbles in the molten glass.

As a result, they have found that a factor to suppress formation of reboil bubbles is not merely the proportion of $SO_3$ contained in the molten glass but the supersaturation degree of $SO_2$ gas formed by decomposition of $SO_3$ contained in the molten glass in a reduced pressure atmosphere. The present invention has been made based on this discovery.

That is, the present invention provides a method for vacuum-degassing molten glass, which comprises melting glass materials to be silicate glass and passing the resulting molten glass in a flow passage in a vacuum degassing vessel, the interior of which is maintained in a reduced pressure state, to vacuum-degas the molten glass, wherein vacuum-degassing of the molten glass is carried out under conditions satisfying the following formula (1) at least at a bottom portion on the downstream side of the glass flow passage of the vacuum degassing vessel:

$$SS = pSO_2/P_{abs} < 2.0 \quad (1)$$

wherein SS is the supersaturation degree of $SO_2$ in the molten glass, $pSO_2$ is the partial pressure (Pa) of $SO_2$ in the molten glass, and $P_{abs}$ is the pressure (Pa) at the bottom portion of the glass flow passage of the vacuum degassing vessel.

In the method for vacuum-degassing molten glass of the present invention, it is preferred that the silicate glass has a composition of $SiO_2 \geq 50$ mol % and (alkali component oxide plus alkaline earth component oxide)$\geq 10$ mol %. The alkali component oxide means $Li_2O$, $Na_2O$ and $K_2O$. The alkaline earth component oxide means MgO, CaO, BaO and SrO.

In the method for vacuum-degassing molten glass of the present invention, it is preferred that vacuum-degassing is carried out under conditions satisfying the above formula (1) within a range of from the downstream end of the glass flow passage to L/2, wherein L is the full length of the glass flow passage of the vacuum degassing vessel in a horizontal direction.

In the method for vacuum-degassing molten glass of the present invention, it is preferred that the glass materials to be silicate glass contain a refining agent containing S (sulfur) element.

Further, the present invention provides an apparatus for a vacuum-degassing molten glass, comprising:

a vacuum housing, the interior of which is vacuumed and is in a reduced pressure state;

a vacuum degassing vessel disposed in the vacuum housing, to vacuum-degas molten glass formed by melting glass materials to be silicate glass;

a supply mechanism to supply the molten glass to the vacuum degassing vessel; and a sending mechanism to send the molten glass after degassed to the subsequent step;

wherein the depth De (m) of the molten glass flowing in at least part of a glass flow passage in the vacuum degassing vessel satisfies the following formula (2):

$$pSO_2/(P_G + \rho g De) < 2.0 \quad (2)$$

wherein $pSO_2$ is the partial pressure (Pa) of $SO_2$ in the molten glass, $P_G$ is the ambient pressure (Pa) of the vacuum degassing vessel, $\rho$ is the specific gravity (kg/m$^3$) of the molten glass, and g is the gravitational acceleration (m/s$^2$).

In the apparatus for vacuum-degassing molten glass of the present invention, it is preferred that the depth De of at least the molten glass flowing on the downstream side of the glass flow passage of the vacuum degassing vessel satisfies the above formula (2).

In the apparatus for vacuum-degassing molten glass of the present invention, it is preferred that the depth De is set so as to satisfy the above formula (2) within a range of from the downstream end of the glass flow passage to L/2, wherein L is the full length of the glass flow passage of the vacuum degassing vessel in a horizontal direction.

In the apparatus for vacuum-degassing molten glass of the present invention, a slope may be formed on the downstream side of the glass flow passage, and the slope is set so that the depth of the molten glass is gradually increased from the upstream side to the downstream side of the glass flow passage.

In the apparatus for vacuum-degassing molten glass of the present invention, it is preferred that the supply mechanism is an uprising pipe disposed on the lower end portion on the upstream side of the vacuum degassing vessel, and the sending mechanism is a downfalling pipe disposed on the lower end portion on the downstream side of the vacuum degassing vessel.

The present invention provides a process for producing molten glass, which comprises a step of degassing molten glass by the above method for vacuum-degassing molten glass, and a melting step of melting glass materials prior to the degassing step.

Further, the present invention provides a process for producing a glass product, which comprises a step of producing molten glass by the above process for producing molten glass, a forming step of forming the molten glass downstream the step for producing molten glass, and an annealing step of annealing the glass after formed.

Further, the present invention provides an apparatus for producing molten glass, which comprises the above vacuum degassing apparatus, and a melting device to melt glass materials to produce molten glass, disposed upstream the vacuum degassing apparatus.

Still further, the present invention provides an apparatus for producing a glass product, which comprises the above apparatus for producing molten glass, a forming device to form the molten glass disposed downstream the apparatus for producing molten glass, and an annealing device to anneal the glass after formed.

Advantageous Effects of Invention

According to the method for vacuum-degassing molten glass of the present invention, by carrying out vacuum-degassing under conditions satisfying the above formula (1), reboiling in the vicinity of the bottom portion of the vacuum degassing vessel by excessive pressure reduction can be suppressed. Therefore, the reboil bubbles will not remain in the molten glass, and the quality of the molten glass and a glass product to be produced can be improved.

Further, according to the method for vacuum-degassing molten glass of the present invention, even when $SO_3$ as a refining agent is contained, formation of reboil bubbles by $SO_2$ formed by decomposition of this $SO_3$ can be suppressed. Therefore, while a refining effect by addition of $SO_3$ is maintained, formation of the reboil bubbles can be suppressed, and vacuum-degassing can effectively be carried out.

According to the apparatus for vacuum-degassing molten glass of the present invention, by having a structure satisfying the above formula (2), reboiling can be suppressed.

Further, in the apparatus for vacuum-degassing molten glass of the present invention, by adjusting the depth of at least the molten glass flowing on the downstream side of the glass flow passage in the vacuum degassing vessel to be a depth satisfying the above formula (2), inclusion of bubbles in a glass product by formation of reboil bubbles in a downstream region can be suppressed. In such a case, even when the depth in the glass flow passage on the upstream side is shallower than the depth on the downstream side satisfying the above formula (2), the reboil bubbles formed on the upstream side will float up and be broken until the molten glass reaches the downstream side, and accordingly the reboil bubbles will not be included in a glass product.

According to the process for producing molten glass of the present invention, an excellent vacuum degassing effect can be realized by employing the above-described vacuum-degassing method.

Further, according to the process for producing a glass product of the present invention, a high quality glass product can be provided by employing the above-described process for producing molten glass.

Further, according to the apparatus for producing molten glass and the apparatus for producing a glass product of the present invention, high quality molten glass and glass product can be provided by employing the above-described vacuum degassing apparatus.

DESCRIPTION OF EMBODIMENTS

Now, embodiments of the method for vacuum-degassing molten glass and the vacuum degassing apparatus according to the present invention will be described. However, it should be noted that the present invention is not limited to the embodiments described below.

Figure 1:
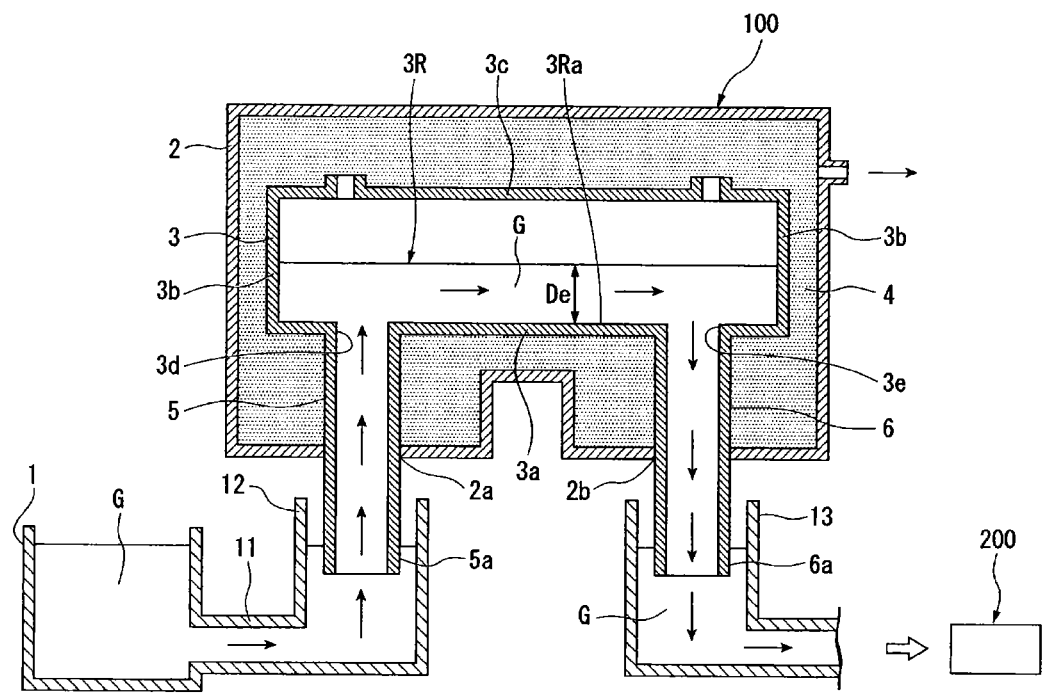
FIG. 1 is a cross sectional view schematically illustrating a vacuum degassing apparatus according to a first embodiment of the present invention.

FIG. 1 is a cross sectional view schematically illustrating an apparatus for vacuum-degassing molten glass according to a first embodiment to be employed for the vacuum-degassing method of the present invention. A vacuum degassing apparatus 100 shown in FIG. 1 is used in a process for vacuum-degassing molten glass G supplied from a melting tank 1 and continuously supplying the degassed molten glass to a forming apparatus 200 in a subsequent step.

The vacuum degassing apparatus 100 according to this embodiment includes a vacuum housing 2 made of a metal such as stainless steel, the interior of which can be maintained in a reduced pressure state at a time of operation. The vacuum housing 2 has a vacuum degassing vessel 3 accommodated therein so that its long axis is in parallel with the horizontal direction. This vacuum degassing vessel 3 is a vessel in the form of an oblong box shape comprising a bottom wall 3a, side walls 3b and a ceiling wall 3c. The vacuum degassing vessel 3 is designed so that the air pressure in it is less than the atmospheric pressure, and makes bubbles in the supplied molten glass G to float up and be broken. To a lower face of one end side of the vacuum degassing vessel 3, an uprising pipe 5 as a supply mechanism is connected via an introduction port 3d so as to vertically extend, and to a lower face of the other end side, a downfalling pipe 6 as a sending mechanism is connected via an exit port 3e so as to vertically extend. The uprising pipe 5 and the downfalling pipe 6 are disposed so as to communicate with outside through an introduction port 2a and an exit port 2b formed on the bottom side of the vacuum housing 2, respectively.

The vacuum housing 2 has a heat-insulating material 4 made of e.g. heat-insulating bricks, disposed around each of the vacuum degassing vessel 3, the uprising pipe 5 and the downfalling pipe 6 therein.

In the vacuum degassing apparatus 100 having the above structure, each of the vacuum degassing vessel 3, the uprising pipe 5 and the downfalling pipe 6 has a structure consisting of a hollow tube made of a ceramic non-metallic inorganic material, or made of platinum or a platinum alloy, which are excellent in the heat resistance and the corrosion resistance to the molten glass, or a combination thereof. In a case where the vacuum degassing vessel 3 is made of a ceramic non-metallic inorganic material, the vacuum degassing vessel 3 is preferably such that its outer shape has a rectangular cross section, it is made of heat-insulating bricks, and the shape of its interior constituting the flow passage for the molten glass has a rectangular cross section. In a case where the vacuum degassing vessel 3 is made of platinum or a platinum alloy, the shape of the interior of the vacuum degassing vessel 3 constituting the flow passage for the molten glass preferably has a circular or elliptic cross section.

As the material of each of the vacuum degassing vessel 3, the uprising pipe 5 and the downfalling pipe 6, in addition to platinum or a platinum alloy, reinforced platinum having a metal oxide dispersed in platinum or a platinum alloy may be mentioned. The metal oxide to be dispersed may be a metal oxide of the Group 3, 4 or 13 of the Long Periodic Table, represented by $Al_2O_3$, $ZrO_2$ or $Y_2O_3$. Further, the ceramic non-metallic inorganic material may be dense refractories. Further, dense refractories lined with platinum or a platinum alloy may also be used.

In a case where the vacuum degassing apparatus 100 is a large-size apparatus having a capacity of at least 200 ton/day, or a capability of at least 500 ton/day, the vacuum degassing vessel 3 is preferably constituted by heat-insulating bricks such as electrocast bricks.

The uprising pipe 5 introduces the molten glass G from the melting tank 1 to the vacuum degassing vessel 3. Therefore, a lower end 5a of the uprising pipe 5 is inserted into an open end of an upstream pit 12 connected to the melting tank 1 via a conducting pipe 11 and immersed into the molten glass G in the upstream pit 12.

Further, the downfalling pipe 6 sends the molten glass G after vacuum-degassed to the subsequent treatment vessel (not shown). Accordingly, a lower end 6a of the downfalling pipe 6 is inserted into an open end of a downstream pit 13 and immersed in the molten glass G in the downstream pit 13. Further, a forming apparatus 200 is connected to the downstream side of the downstream pit 13. In the vacuum degassing apparatus 100 according to this embodiment, the uprising pipe 5 constitutes a supply mechanism to supply the molten glass to the vacuum degassing vessel, and the downfalling pipe 6 constitutes a molten glass sending mechanism to send the molten glass after degassed in the vacuum degassing vessel to the subsequent step. In this specification, a glass flow passage 3R indicates a portion constituting a flow passage for the molten glass G in the vacuum degassing vessel 3. In the case of the vacuum degassing apparatus 100 as shown in FIG. 1, the glass flow passage 3R means the entire region where the molten glass G which entered into the vacuum degassing vessel 3 from the uprising pipe 5 flows until it exits to the downfalling pipe 6. Accordingly, the full length of the glass flow passage 3R is equal to the full length of the space in the vacuum degassing vessel 3.

Further, in this specification, the wordings "upstream" and "downstream" respectively mean an upstream side and a downstream side in the flowing direction of the molten glass G flowing through the glass flow passage 3R of the vacuum degassing apparatus 100.

According to the vacuum-degassing method of the present invention, the molten glass G supplied from the melting tank 1 is passed through the glass flow passage 3R in the vacuum degassing vessel 3, the interior of which is depressurized to a predetermined degree of vacuum to carry out vacuum-degassing. The molten glass G is preferably continuously supplied to the vacuum degassing vessel 3 and continuously discharged from the vacuum degassing vessel 3.

The molten glass G to be used in the vacuum degassing method of the present invention is one formed by melting glass materials to be silicate glass. In the method for vacuum-degassing molten glass of the present invention, the silicate glass preferably contains at least 50 mol % of $SiO_2$ with a view to obtaining the chemical durability endurable for practical use, more preferably at least 60 mol % with a view to further improving the chemical durability, further preferably at least 65 mol % with a view to still further improving the chemical durability.

Further, the total content of an alkali component oxide and an alkaline earth component oxide (in this specification, this total content will be referred to as "alkali component oxide plus alkaline earth component oxide") is preferably at least 10 mol % with a view to suppressing phase separation of the molten glass, more preferably at least 15 mol % with a view to lowering the viscosity of the molten glass to lower the working temperature in each step, further preferably at least 20 mol % with a view to further lowering the viscosity of the molten glass to lower the working temperature in each step. Here, the alkali component oxide means $Li_2O$, $Na_2O$ and $K_2O$. Further, the alkaline earth component oxide means MgO, CaO, BaO and SrO. The above silicate glass is required to contain both the alkali component oxide and the alkaline earth component oxide. That is, the silicate glass contains at least one alkali component oxide selected from the group consisting of $Li_2O$, $Na_2O$ and $K_2O$ and at least one alkaline earth component oxide selected from the group consisting of MgO, BaO and SrO, in a total content of at least 10 mol %. The silicate glass may contain an oxide other than the above in order to obtain desired properties depending upon the purpose of use, as described hereinafter.

The present invention is applicable, in the case of glass for building and glass for automobiles, to glass having a composition comprising, as represented by mass percentage based on oxides, from 65 to 75% of $SiO_2$, from 0 to 3% of $Al_2O_3$, from 5 to 15% of CaO, from 0 to 15% of MgO, from 10 to 20% of $Na_2O$, from 0 to 3% of $K_2O$, from 0 to 5% of $Li_2O$, from 0 to 3% of $Fe_2O_3$, from 0 to 5% of $TiO_2$, from 0 to 3% of $CeO_2$, from 0 to 5% of BaO, from 0 to 5% of SrO, from 0 to 5% of $B_2O_3$, from 0 to 5% of ZnO, from 0 to 5% of $ZrO_2$, from 0 to 3% of $SnO_2$, from 0 to 0.1% of Se, from 0 to 0.1% of CoO, and from 0 to 0.1% of $Cr_2O_3$.

The present invention is also applicable, in the case of glass for displays, to glass having a composition comprising, as represented by mass percentage based on oxides, from 50 to 72% of $SiO_2$, from 0 to 15% of $Al_2O_3$, from 4 to 30% of MgO+CaO+SrO+BaO, from 0 to 10% of $Na_2O$, from 1 to 20% of $K_2O$, from 0 to 5% of $Li_2O$, from 6 to 30% of $Na_2O+K_2O+Li_2O$, and from 0 to 20% of $ZrO_2$.

The present invention is also applicable, in the case of glass for hard disks, to glass having a composition comprising, as represented by mass percentage based on oxides, from 50 to 72% of $SiO_2$, from 0 to 20% of $B_2O_3$, from 0 to 25% of $Al_2O_3$, from 0 to 30% of MgO+CaO+SrO+BaO, from 0 to 20% of $Na_2O$, from 0 to 20% of $K_2O$, from 0 to 20% of $Li_2O$, from 6 to 30% of $Na_2O+K_2O+Li_2O$, from 0 to 20% of $ZrO_2$, from 0 to 20% of $Y_2O_3$, from 0 to 20% of $La_2O_3$ and from 0 to 20% of ZnO.

The present invention is also applicable, in the case of chemically tempered glass for thin plates, to glass having a composition comprising, as represented by weight percentage based on oxides, from 50 to 75% of $SiO_2$, from 0 to 20% of $Al_2O_3$, from 4 to 30% of MgO+CaO+SrO+BaO, from 0 to 20% of $Na_2O$, from 0 to 15% of $K_2O$, from 0 to 20% of $Li_2O$, from 6 to 30% of $Na_2O+K_2O+Li_2O$, and from 0 to 20% of $ZrO_2$.

Each of the above glasses may contain $As_2O_3$, $Sb_2O_3$, MnO, NiO, $V_2O_5$, CuO or the like in an amount of at most 5% as additives.

The above glass may contain a colorant, for example, from 0 to 10% of $Fe_2O_3$, from 0 to 10% of $TiO_2$, from 0 to 10% of $CeO_2$, from 0 to 10% of CoO, from 0 to 10% of $Cr_2O_3$, from 0 to 1% of Se, or the like. More preferably the glass contains a colorant, for example, from 0 to 5% of $Fe_2O_3$, from 0 to 5% of $TiO_2$, from 0 to 3% of $CeO_2$, from 0 to 1% of CoO, from 0 to 1% of $Cr_2O_3$, from 0 to 1% of Se, or the like.

The glass materials to be silicate glass to which the present invention is applicable preferably contain a refining agent containing S (sulfur) element. The S component as the refining agent may be contained in an amount of from 0.01 to 0.5% as calculated as $SO_3$. If the addition amount of $SO_3$ exceeds 0.5%, the bubble layer in the melting tank 1 may be excessive. Further, if the addition amount of $SO_3$ is less than 0.01%, the refining effect may be insufficient.

The present inventors have conducted studies on the vacuum-degassing method capable of suppressing formation of new bubbles by reboiling while effectively removing the bubbles in the molten glass. As a result, they have found that floating bubbles observed in the downstream region of the vacuum degassing vessel are the above-mentioned narrowly-defined reboil bubbles formed at the interface between the molten glass and the furnace material in the vacuum degassing vessel. They have further found that the origin of reboiling is $SO_2$ gas formed by decomposition of $SO_3$ contained in the molten glass under excessively reduced pressure, since the number of floating bubbles in the downstream region of the vacuum degassing vessel is influenced not only by the temperature and the degree of vacuum but also by the $SO_3$ concentration in the molten glass. Here, as the origin of reboiling, $H_2O$ gas formed from the moisture in the molten glass was also suspected. However, as described hereinafter, there was no correlation between the moisture in the molten glass and the frequency of formation of reboil bubbles.

The most of $SO_3$ contained in the molten glass is usually derived from sodium sulfate ($Na_2SO_4$) added as a refining agent containing S (sulfur) element to the material batch, however, a sulfur component contained as an impurity in other materials, and a sulfur component contained in a fuel oil firing atmosphere to be employed for heating of the melting tank are also its supply sources. Accordingly, it may be considered to lower the $SO_3$ concentration in the molten glass by not adding sodium sulfate to the material batch to prevent reboiling. However, if the concentration of $SO_3$ which functions as a refining agent in the vacuum-degassing step is insufficient, no sufficient degassing effect may be obtained in some cases. Further, if sodium sulfate which also acts as an oxidizing agent is not added, the molten glass tends to be reducing, and the solubility of $SO_3$ in the molten glass tends to be low. As a result, $SO_3$ in the molten glass supplied from components other than sodium sulfate tends to be decomposed, and reboiling by $SO_2$ gas is likely to occur.

Therefore, the present inventors have found that even when the molten glass G supplied to the vacuum degassing vessel contains $SO_3$ at a concentration sufficient to obtain the refining effect, reboiling by $SO_2$ gas will not occur when the partial pressure of $SO_2$ gas formed by decomposition of $SO_3$ is lower than the pressure under which the $SO_2$ gas can be dissolved in the molten glass G, and accomplished the present invention which can effectively prevent reboiling.

Figure 2:
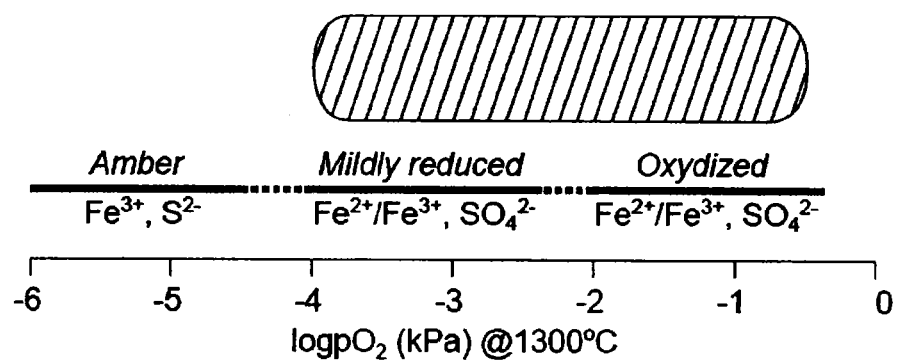
FIG. 2 is a view illustrating the relation between $pO_2$ and the dissolution states of S and Fe in molten glasses of various silicate glasses.

It has been known that the dissolution state of S (sulfur) in the molten glass G varies depending upon the oxidizing property or the reducing property of the molten glass G, i.e. $pO_2$ corresponding to the activity of dissolved oxygen molecules. In an oxidizing matrix with a high $pO_2$, the S component is present as $SO_4^{2-}$ (sulfate ion) and in a reducing matrix with a low $pO_2$, it is present as $S^{2-}$ (sulfide ion). FIG. 2 is a view illustrating the $pO_2$ values of molten glasses at 1,300° C. of various silicate glasses, and chemical species of Fe and S dissolved in such molten glasses. It is evident from FIG. 2 that $S^{2-}$ ions are present in strongly reducing amber glass with $pO_2 < 10^{-4.5}$ kPa, and $SO_4^{2-}$ ions are present in weakly reducing or oxidizing molten glass with $pO_2 > 10^{-4}$ kPa. As described in the after-mentioned examples, $pO_2$ of the molten glass G at 1,300° C. to be used in the vacuum-degassing method of the present invention is in a range of from $10^{-4}$ to $10^{-0.5}$ kPa indicated by oblique lines in FIG. 2, and the state how S is present in the molten glass G is $SO_4^{2-}$ ions. The solubility of $SO_4^{2-}$ in the molten glass is higher at a lower temperature, and higher when the $pO_2$ is higher and the glass is highly oxidizing.

The decomposition reaction of $SO_4^{2-}$ ions in the molten glass G is represented by the following formulae.

$$SO_4^{2-} \leftrightarrow SO_2 + \frac{1}{2}O_2 + O^{2-} \tag{3}$$

From the formulae (3) and (4), the $SO_4^{2-}$ concentration which can be dissolved in the molten glass G is determined by $pSO_2$, $pO_2$, the oxygen ion activity $aO^{2-}$ and K (equilibrium constant) in the molten glass G. In an oxidizing glass matrix with a higher $pO_2$, the $SO_4^{2-}$ solubility is higher. $aO^{2-}$ corresponds to the basicity of the glass determined by the glass mother composition. For example, the more the glass composition contains highly basic $K^+$ or $Na^+$ ions, the higher $aO^{2-}$ in the glass structure, and the higher the $SO_4^{2-}$ solubility. Here, in the present invention, $SO_4^{2-}$ ions in the molten glass G will be referred to as $SO_3$ as an oxide. As a result, the formulae (3) and (4) can be represented as follows.

$$SO_3 \leftrightarrow SO_2 + \frac{1}{2}O_2 \tag{5}$$

In the formula (6), K' is the pseudo equilibrium constant including the influence of $aO^{2-}$, $pSO_2$ is the partial pressure (Pa) of $SO_2$ in the molten glass G, $pO_2$ is the partial pressure (Pa) of $O_2$ in the molten glass G, and $[SO_3]$ is the concentration (wt %) of $SO_3$ in the molten glass G. As shown in the after-mentioned Examples, at a temperature of from 1,200 to 1,300° C. which is common in the vacuum degassing vessel, $pO_2$ in the molten glass G is less than $10^{-0.5}$ kPa, which is sufficiently lower than the absolute pressure in the vacuum degassing vessel 3. On the other hand, $pSO_2$ in this temperature range is higher than 10 kPa, which is higher than the absolute pressure in some cases. Therefore, when $pSO_2$ is noted, the formula (6) can be modified as follows:

$$p(SO)_2 = \frac{K' \times [SO_3]}{\sqrt{pO_2}} \tag{7}$$

When the $SO_3$ concentration, $pO_2$ and K' in the molten glass G in the vacuum degassing vessel 3 are known, $pSO_2$ can be determined. Since the $SO_3$ concentration change in the molten glass G as between before and after the molten glass G is passed through the vacuum degassing vessel 3 is negligibly small, $[SO_3]$ can be known by fluorescent X-ray analysis of a plate-shape sample obtained by cooling the molten glass G after vacuum-degassed. Measurement of $pO_2$ in the molten glass G can be carried out by a commercially available oxygen sensor for molten glass employing zirconia electrolyte. It is desirable to directly measure $pO_2$ of the molten glass G in the vacuum degassing vessel 3, however, it is possible to substitute direct measurement by measurement of $pO_2$ of the molten glass obtained by re-melting the plate-shape sample formed by cooling the molten glass G after vacuum-degassed, in an experimental furnace under atmospheric pressure. At the time of re-melting under atmospheric pressure, the temperature should not be increased to a temperature at which continuous foaming by $SO_3 \rightarrow SO_2 + \frac{1}{2}O_2$ occurs. The pseudo equilibrium constant K' can be determined by measuring the $SO_3$ concentration in equilibrium with an atmosphere with known $pSO_2$ and $pO_2$. The method for determining the pseudo equilibrium constant K' will be described hereinafter.

It is considered that reboiling by $SO_2$ gas occurs if $pSO_2$ of the molten glass G is higher than the absolute pressure in the vacuum degassing vessel 3. In order for clear understanding of the reboil occurrence conditions, the $SO_2$ supersaturation degree SS is defined. The $SO_2$ supersaturation degree SS is defined as follows, as the ratio of the partial pressure $pSO_2$ of SO$_2$ gas formed by decomposition of SO$_3$ in the molten glass G to the absolute pressure P$_{abs}$ in the vacuum degassing vessel 3:

$$SS = \frac{pSO_2}{P_{abs}} \quad (8)$$

When the SO$_2$ supersaturation degree SS is higher than 1, theoretically reboiling by SO$_2$ may occur. Further, in the present invention, the pressure P at the bottom portion of the glass flow passage 3R corresponding to the interface between the vacuum degassing vessel 3 and the molten glass G can be represented as the absolute pressure P$_{abs}$ (P=P$_{abs}$) in the formula (8). Further, as shown in the after-mentioned Examples, reboiling can be prevented by carrying out vacuum-degassing under conditions where the SO$_2$ supersaturation degree SS in the molten glass G, the partial pressure pSO$_2$ (Pa) of SO$_2$ and the pressure P$_{abs}$ (Pa) at the bottom portion of the glass flow passage of the vacuum degassing vessel 3 satisfy the following formula:

$$SS = \frac{pSO_2}{P_{abs}} < X \quad (9)$$

Figure 8:
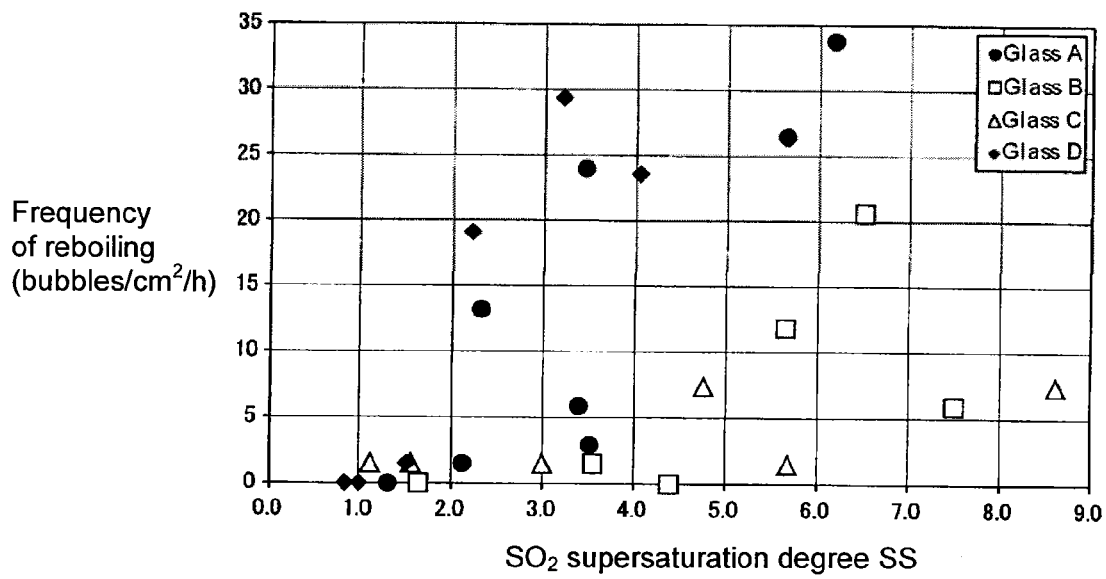
FIG. 8 is a graph obtained by plotting the relation between the $SO_2$ supersaturation degree SS and the frequency of reboiling of molten glasses in Example 1.

FIG. 8 is a graph illustrating the relation between the SO$_2$ supersaturation degrees SS (the second column from the right in Table 2) of SO$_3$ in the molten glasses G when various silicate glasses are vacuum-degassed and the frequency of reboiling (the rightmost column in Table 2). As shown in FIG. 8, when the supersaturation degree SS is less than 2.0 (X=2.0, that is, corresponding to the formula (1)), at least the frequency of reboiling can be suppressed to be at most 10 bubbles/cm$^2$/h. Further, when the supersaturation degree SS is less than 1.5 (X=1.5), at least the frequency of reboiling can be suppressed to be at most 2 bubbles/cm$^2$/h. Further, when SS is less than 1.0 (X=1.0), no reboil bubbles will form in principle and as actual phenomenon.

Further, in order that vacuum-degassing is carried out under conditions represented by the formula (9) (and the formula (1)), the depth De (m) of the molten glass G flowing in the glass flow passage 3R of the vacuum degassing vessel 3 of the vacuum degassing apparatus 100 is set to satisfy the following formula (2):

$$\frac{pSO_2}{P_G + \rho g De} < 2.0 \quad (2)$$

In the formula (2), pSO$_2$ is the partial pressure (Pa) of SO$_2$ in the molten glass, P$_G$ is the ambient pressure (Pa) of the vacuum degassing vessel, $\rho$ is the specific gravity (kg/m$^3$) of the molten glass, and g is the gravitational acceleration (m/s$^2$).

By setting the depth De of the molten glass G in the vacuum degassing vessel 3 of the vacuum degassing apparatus 100 to satisfy the formula (2), reboiling can be suppressed. Further, in order to effectively carry out vacuum-degassing of the molten glass G and suppress reboiling, in addition to setting the pressure P$_{abs}$ at the bottom portion of the glass flow passage 3R (i.e. the lower end region of the glass flow passage on a side where the glass flow passage 3R is in contact with the bottom wall 3a) to satisfy the formula (2), it is preferred to carry out vacuum-degassing in an atmosphere under a pressure lower than the bubble growth starting pressure selected in accordance with the type of glass, as disclosed by the present applicant in WO2007/111079.

Now, the above-described point such that there was no correlation between the moisture in the molten glass and the frequency of formation of reboil bubbles will be described. The molten glass G to be used in the vacuum-degassing method of the present invention may contain moisture. The moisture contained in the molten glass G here means hydroxy groups represented by Si—OH. The moisture in the molten glass G is derived from hydroxy groups in the materials, moisture adsorbed in the materials, water vapor contained in the atmosphere in which the glass is melted, and the like. The moisture in the molten glass G functions as a component to refine glass by growing bubbles by formation of H$_2$O gas in the vacuum-degassing step to increase the bubble floating speed and facilitate breakage of the bubbles.

The present inventors have conducted studies on the relation between the H$_2$O supersaturation degree in the molten glass G and the frequency of formation of reboil bubbles. The H$_2$O supersaturation degree SH is defined as follows as the ratio of the partial pressure pH$_2$O of H$_2$O gas formed from the moisture in the glass to the absolute pressure P$_{abs}$ in the vacuum degassing vessel 3:

$$SH = \frac{pH_2O}{P_{abs}} \quad (10)$$

Figure 9:
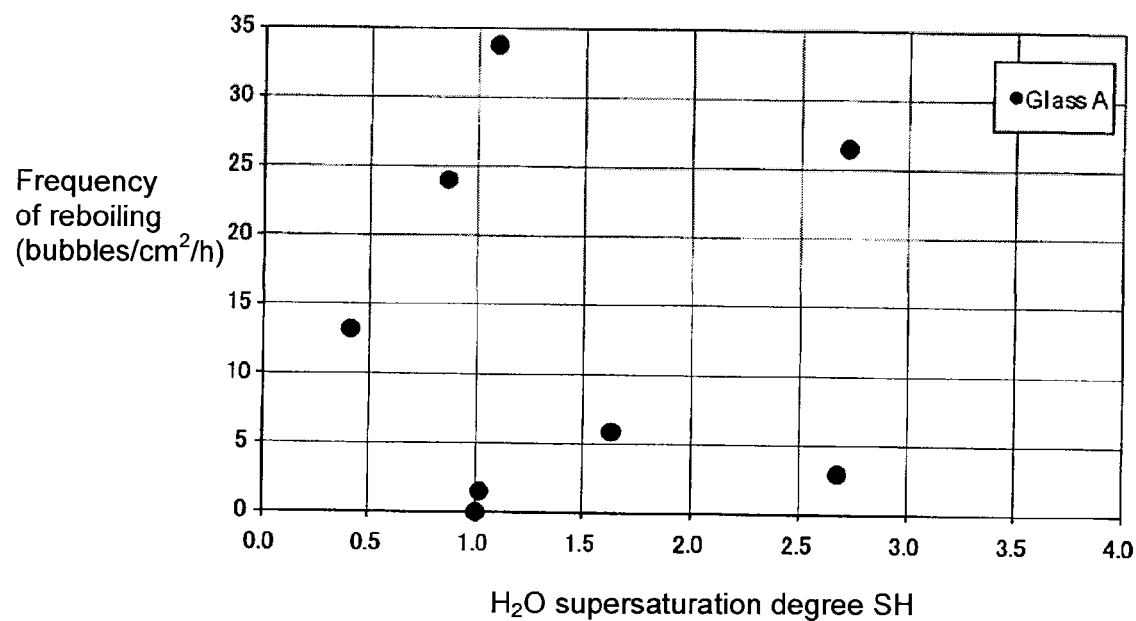
FIG. 9 is a graph obtained by plotting the relation between the $H_2O$ supersaturation degree SH and the frequency of reboiling of molten glasses in Example 2.

FIG. 9 is a graph obtained by plotting the frequency of reboiling relative to the H$_2$O supersaturation degree in the molten glass G, which will be described in detail in the after-mentioned Example 2. As evident from FIG. 9, there was no correlation between the H$_2$O supersaturation degree SH in the molten glass G and the frequency of formation of reboil bubbles.

In the vacuum-degassing method of the present invention, in order to carry out vacuum-degassing while suppressing reboiling, the molten glass G should be passed in the glass flow passage 3R in the vacuum degassing vessel 3 under conditions satisfying the formula (1) or (2). When vacuum-degassing is carried out, the vacuum housing 2 is evacuated of air by a vacuum degassing device (not shown) such as a vacuum pump from outside, whereby the vacuum degassing vessel 3 housed in the vacuum housing 2 is evacuated of air, and the interior of the vacuum degassing vessel 3 is in a reduced pressure state.

The average temperature of the molten glass G flowing in the glass flow passage 3R in the vacuum degassing vessel 3 is preferably from 1,050 to 1,350° C. In the case of the glass composition as specified above, the viscosity of the molten glass G at a temperature of from 1,050 to 1,350° C. is from 20 to 650 Pa·s. When the viscosity of the molten glass G is within the above range, the flow of the molten glass G in the vacuum degassing vessel 3 will not remarkably be low, and the molten glass G will not leak from a joint of the vacuum degassing vessel 3.

The dimensions of the respective constituents for the vacuum degassing apparatus 100 of the present invention may properly be selected as the case requires. The dimensions of the vacuum degassing vessel 3 may be properly selected depending upon the vacuum degassing apparatus to be used, regardless of whether the vacuum degassing vessel 3 is made of platinum or a platinum alloy, or dense refractories. In the case of the vacuum degassing vessel 3 shown in FIG. 1, the dimensions are specifically as follows.

Length in a horizontal direction: 1 to 20 m

Inner diameter: 0.2 to 3 m

In a case where the vacuum degassing vessel 3 is made of platinum or a platinum alloy, the thickness is preferably from 0.5 to 4 mm.

The vacuum housing 2 is made of a metal, for example, stainless steel, and has a shape and dimensions capable of housing the vacuum degassing vessel 3.

The uprising pipe 5 and the downfalling pipe 6 may properly be selected depending upon the vacuum degassing apparatus to be used, regardless of whether they are made of platinum or a platinum alloy or dense refractories. For example, the dimensions of the uprising pipe 5 and the downfalling pipe 6 are as follows.

Inner diameter: 0.05 to 0.8 m

Length: 0.2 to 6 m

In a case where the uprising pipe and the downfalling pipe are made of platinum or a platinum alloy, the thickness is preferably from 0.4 to 5 mm.

The vacuum degassing apparatus of the present invention is not limited to the vacuum degassing apparatus 100 as shown in FIG. 1, and modification is possible. Now, a vacuum degassing apparatus of the present invention according to another embodiment will be described. In the following description, the same constituents as for the above-described vacuum degassing apparatus 100 are provided with the same symbols, and their explanations are omitted.

Figure 3:
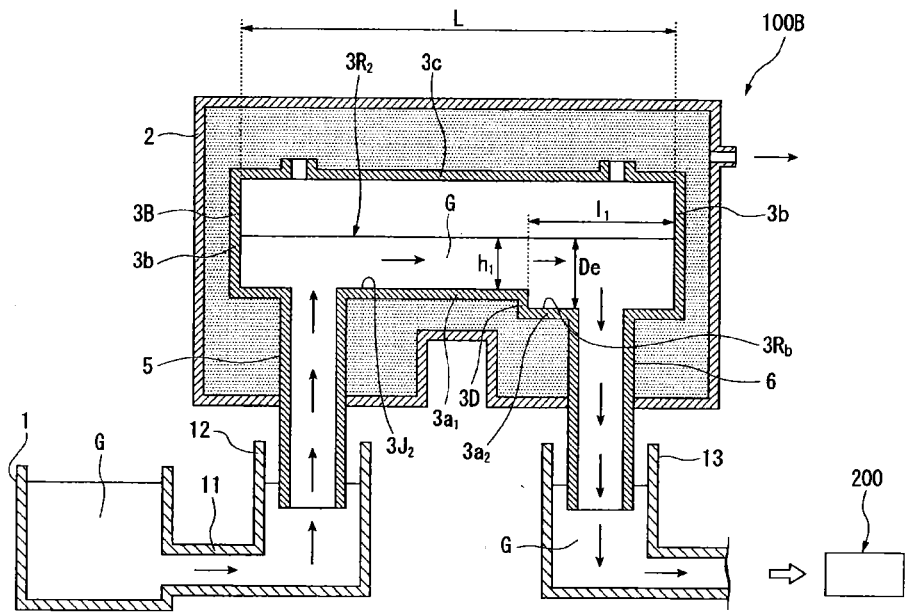
FIG. 3 is a cross sectional view schematically illustrating a vacuum degassing apparatus according to a second embodiment of the present invention.

FIG. 3 is a cross sectional view schematically illustrating a vacuum degassing apparatus according to a second embodiment of the present invention. A vacuum degassing apparatus 100B shown in FIG. 3 is different from the above-mentioned vacuum degassing apparatus 100 in that a glass flow passage $3R_2$ in a vacuum degassing vessel 3B is set deep on the downstream side.

The vacuum degassing vessel 3B of the vacuum degassing apparatus 100B according to this embodiment is formed so that a bottom wall $3a_2$ (the bottom portion of the vacuum degassing vessel) of the vacuum degassing vessel 3B located on the downstream side of the glass flow passage $3R_2$ is one step lower than a bottom wall $3a_1$ of the vacuum degassing vessel 3B located on the upstream side of the glass flow passage $3R_2$, in order that the depth De of the molten glass G flowing on the downstream side of the glass flow passage $3R_2$ satisfies the above formula (2). In the example shown in FIG. 3, a step portion 3D as a boundary between the bottom wall $3a_1$ and bottom wall $3a_2$ is formed at a portion slightly closer to a downfalling pipe 6 than the middle of the uprising pipe 5 and the downfalling pipe 6, however, this is merely one example, and the position of the step portion 3D may be any position on the downstream side of the glass flow passage $3R_2$. By employing the vacuum degassing apparatus 100B having such a structure, vacuum-degassing can be carried out under the glass flow passage $3R_2$ satisfies the above formula (1), and reboiling can be suppressed.

In the vacuum degassing apparatus 100B shown in FIG. 3, the depth $h_1$ on the upstream side of the glass flow passage $3R_2$ is set shallower than the depth De on the downstream side. The pressure at a bottom portion $3J_2$ of the glass flow passage $3R_2$ on the upstream side is lower than the pressure $P_{abs}$ at a bottom portion $3R_b$ of the glass flow passage $3R_2$ on the downstream side (that is, the degree of vacuum is higher) corresponding to a shallow depth of the molten glass G. Accordingly, in the molten glass G flowing in the glass flow passage $3R_2$ on the upstream side, reboiling may occur. However, in the vacuum degassing apparatus 100B according to this embodiment, even if reboiling occurs in the molten glass G with a depth $h_1$, the reboil bubbles will reach the surface layer of the molten glass G until the molten glass G flows to the downstream side, and the bubbles will be broken, whereby the molten glass can be degassed. That is, the upstream side of the vacuum degassing vessel 3B may be considered as a region where the sizes of all the bubbles including the reboil bubbles are positively enlarged, rather than suppressing reboiling.

On the other hand, if reboil bubbles form on the downstream side of the glass flow passage $3R_2$, the reboil bubbles are highly likely to be discharged from the downfalling pipe 6 without being broken, and bubbles may remain in molten glass and a glass product to be produced. However, in the vacuum degassing apparatus 100B according to this embodiment, the depth of the molten glass is set so as to satisfy the formula (2) on the downstream side of the glass flow passage $3R_2$ of the vacuum degassing vessel 3B, whereby reboiling on the downstream side of the glass flow passage $3R_2$ can be suppressed. Therefore, according to the vacuum degassing apparatus 100B according to this embodiment, remaining of bubbles in molten glass and a glass product to be produced can effectively be suppressed.

In the vacuum degassing vessel 3B, the region where the depth De of the molten glass G satisfies the formula (2) is set to a distance $l_1$ along a direction from the inner face end of a side wall 3b closest to the downfalling pipe 6 regarded as the downstream end of the glass flow passage $3R_2$ toward the uprising pipe 5. This distance $l_1$ is preferably L/2, wherein L is the full length of the glass flow passage $3R_2$ of the vacuum degassing vessel 3B in a horizontal direction (that is, the full length of the vacuum degassing vessel 3B). By such a distance $l_1$, even if reboil bubbles form in the molten glass G on the upstream side with a depth $h_1$, the reboil bubbles formed on the upstream side can be removed before the molten glass reaches the downstream side. Further, since the formula (2) is satisfied on the downstream side, formation of reboil bubbles on the downstream side can effectively be suppressed. In a case where the reboil occurrence region is concentrated at the bottom portion on the downstream side of the vacuum degassing vessel 3B, since the bubbles in the molten glass G should be removed on the upstream side as far as possible, the distance $l_1$ may be shorter than L/2, and may properly be determined depending upon the reboil occurrence region.

The dimensions of the respective constituents for the vacuum degassing apparatus 100B according to this embodiment may properly be selected, and for example, they can be set in the same manner as the above-described vacuum degassing apparatus 100.

The difference between the depth $h_1$ on the upstream side and the depth De on the downstream side of the molten glass G may properly be adjusted. For example, the depth De can be set deeper by about 1 m than the depth $h_1$.

Figure 4:
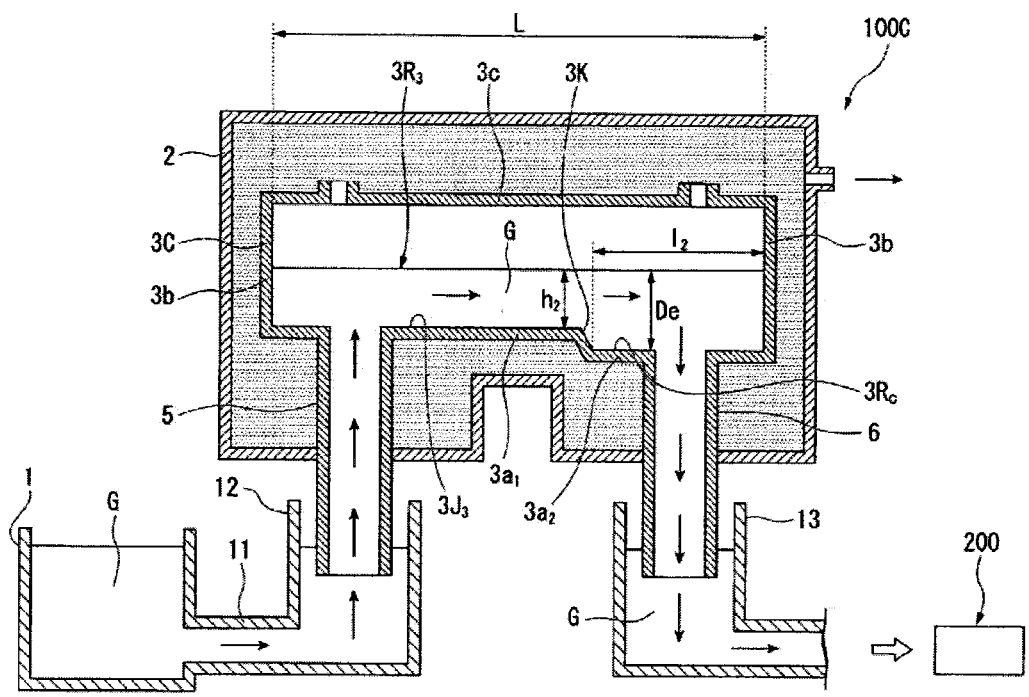
FIG. 4 is a cross sectional view schematically illustrating a vacuum degassing apparatus according to a third embodiment of the present invention.

FIG. 4 is a cross sectional view schematically illustrating a vacuum degassing apparatus according to a third embodiment of the present invention.

A vacuum degassing apparatus 100C shown in FIG. 4 is different from the above-mentioned vacuum degassing apparatus 100 in that a slope 3K is formed on the downstream side of a glass flow passage $3R_3$ of a vacuum degassing vessel 3C, and this slope 3K is set so that the depth of the molten glass G is gradually increased from the upstream side to the downstream side of the glass flow passage $3R_3$.

The vacuum degassing vessel 3C of the vacuum degassing apparatus 100C according to this embodiment is formed, in the same manner as the vacuum degassing apparatus 100B according to a second embodiment, so that a bottom wall $3a_2$ of the vacuum degassing vessel 3C located on the downstream side of the glass flow passage $3R_3$ is one step lower than a bottom wall $3a_1$ of the vacuum degassing vessel 3C located on the upstream side of the glass flow passage $3R_3$, in order that the depth De of the molten glass G flowing on the downstream side of the glass flow passage $3R_3$ satisfies the formula (2). In the example shown in FIG. 4, the slope 3K as a boundary between the bottom wall $3a_1$ and the bottom wall $3a_2$ is formed at a position slightly closer to a downfalling pipe 6 than the middle of an uprising pipe 5 and the downfalling pipe 6, however, this is a mere example, and the position of formation of the slope 3K may be at any position on the downstream side of the glass flow passage $3R_3$. By using the vacuum degassing apparatus 100C having such a structure, vacuum-degassing can be carried out under conditions where the pressure $P_{abs}$ at a bottom portion $3R_c$ on the downstream side of the glass flow passage $3R_3$ satisfies the above formula (1), and reboiling can be suppressed.

In the vacuum degassing apparatus 100C shown in FIG. 4, the depth De of the molten glass G is set to satisfy the formula (2) within a range of a distance $l_2$ from the downstream end of the glass flow passage $3R_3$, whereby even if reboiling occurs in the molten glass G at the upstream side with a depth $h_2$, reboil bubbles will reach the surface layer of the molten glass G and be broken until the molten glass G flows to the downstream side, whereby the molten glass can be degassed. Further, since the formula (2) is satisfied on the downstream side of the glass flow passage $3R_3$, reboiling on the downstream side of the glass flow passage $3R_3$ can be suppressed. Therefore, according to the vacuum degassing apparatus 100C according to this embodiment, remaining of bubbles in molten glass and a glass product to be produced can effectively be suppressed.

The slope 3K is continuously formed between a bottom portion $3J_3$ on the upstream side with a depth $h_2$ of the glass flow passage $3R_3$ and a bottom portions $3R_c$ on the downstream side with a depth De of the glass flow passage $3R_3$. The depth of the molten glass G flowing in a region where the slope 3K is formed is gradually increased from the depth $h_2$ to the depth De from the upstream side toward the downstream side. Accordingly, the flow rate of the molten glass G flowing in the slope 3K is gradually decreased along with an increase in the depth of the glass flow passage $3R_3$. By slowing down the flow speed of the molten glass G on the downstream side of the glass flow passage $3R_3$ as mentioned above, the floating speed of bubbles in the molten glass G can be increased relative to the flow rate of the molten glass G, whereby the vacuum degassing effect can be more increased.

In the vacuum degassing vessel 3C, the region where the depth De of the molten glass G satisfies the formula (2) is set to a distance $l_2$ along a direction from an inner face end of a side wall $3b$ closest to the downfalling pipe 6 regarded as the downstream end of the glass flow passage $3R_3$ toward the uprising pipe 5. The distance $l_2$ is preferably set within the same range as the distance of the vacuum degassing apparatus 100B as mentioned above. By such a distance $l_2$, even if reboil bubbles form on the molten glass G on the upstream side with a depth $h_2$, the reboil bubbles formed on the upstream side can be removed before the molten glass G reaches the downstream side. Further, since the formula (2) is satisfied on the downstream side of the glass flow passage $3R_3$, formation of reboil bubbles on the downstream side can effectively be suppressed.

The dimensions of the respective constituents for the vacuum degassing apparatus 100C according to this embodiment may properly be selected, and for example, they can be set in the same manner as the above vacuum degassing apparatus 100.

The difference between the depth $h_2$ on the upstream side and the depth De on the downstream side of the molten glass G may properly be adjusted. For example, the depth De can be set deeper by about 1 m than the depth $h_2$.

Further, the angle of slope relative to the horizontal direction and the length in a horizontal direction of the slope 3K may properly be adjusted in accordance with the dimensions of the vacuum degassing apparatus. In the vacuum degassing apparatus 100C shown in FIG. 4, a slope 3K having one smooth surface is exemplified. The vacuum degassing apparatus of the present invention is not limited thereto so long as retention of the molten glass in the vicinity of the upper edge of the downfalling pipe 6 can be suppressed. For example, the slope 3K may be stepwise, may be curved being concave down, or may be curved being concave up.

Figure 5:
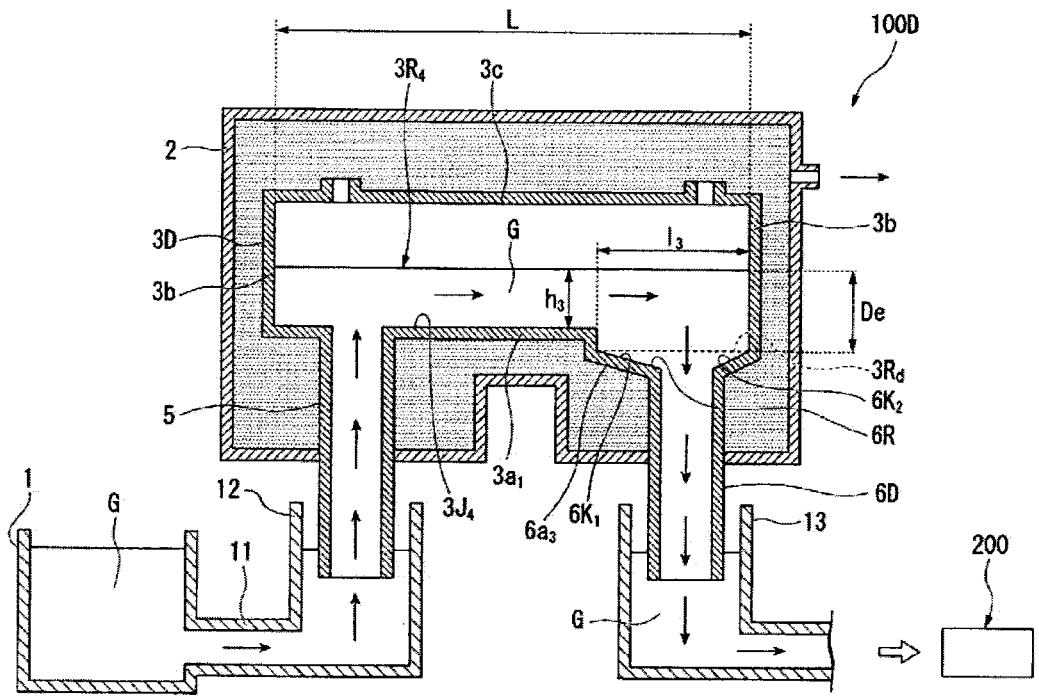
FIG. 5 is a cross sectional view schematically illustrating a vacuum degassing apparatus according to a fourth embodiment of the present invention.

FIG. 5 is a cross sectional view schematically illustrating a vacuum degassing apparatus according to a fourth embodiment of the present invention.

A vacuum degassing apparatus 100D shown in FIG. 5 is the same as the vacuum degassing apparatus 100B in that a vacuum degassing vessel 3D is formed so that the depth of the molten glass is deeper on the downstream side of a glass flow passage $3R_4$, but is different from the vacuum degassing apparatus 100B in that a portion to reach a downfalling pipe 6D connected to the downstream side of the vacuum degassing vessel 3D is formed in a funnel shape, and the shape of a glass flow passage 6R therein is different from the vacuum degassing apparatus 100B.

In the vacuum degassing apparatus 100D according to this embodiment, a funnel-shape connection wall $6a_3$ is formed at a boundary between a bottom wall $3a_1$ of the vacuum degassing vessel 3D and a downfalling pipe 6D, and the depth De of molten glass G on the connection wall $6a_3$ is set to satisfy the formula (2). By using the vacuum degassing apparatus 100D having such a structure, vacuum-degassing can be carried out under conditions where the pressure $P_{abs}$ of the molten glass G at a lowermost portion (bottom portion) $3R_d$ on the downstream side of the glass flow passage $3R_4$, that is, located on the upper end portion of the connection wall $6a_3$ satisfies the formula (1), and reboiling can be suppressed.

In the vacuum degassing apparatus 100D shown in FIG. 5, the depth De of the molten glass G is set to satisfy the formula (2) within a range of a distance $l_3$ from the downstream end of the glass flow passage $3R_4$, whereby even if reboiling occurs in the molten glass G on the upstream side with a depth $h_3$, the reboil bubbles will reach the surface layer of the molten glass G and be broken until the molten glass G flows to the downstream side, whereby the molten glass can be degassed. Further, since the formula (2) is satisfied on the downstream side of the glass flow passage $3R_4$, reboiling itself on the downstream side of the glass flow passage $3R_4$ can be suppressed. Therefore, according to the vacuum degassing apparatus 100D according to this embodiment, remaining of bubbles in molten glass and a glass product to be produced can effectively be suppressed.

Further, in the vacuum degassing apparatus 100D according to this embodiment, the glass flow passage 6R formed by the connection wall $6a_3$ is formed as downwardly constricted, whereby the flow rate of the molten glass G flowing on the downstream side of the vacuum degassing vessel 3D and in the vicinity of the connection wall $6a_3$ can be reduced, and the floating speed of the bubbles in the molten glass G can be made higher relative to the flow rate of the molten glass G, and the vacuum degassing effect can be more increased.

In the vacuum degassing vessel 3D, the region where the depth De of the molten glass G satisfies the formula (2) is set in a distance $l_3$ along a direction from an inner face end of a side wall 3b closest to the downfalling pipe 6D regarded as the downstream end of the glass flow passage $3R_4$ toward the uprising pipe 5. The distance $l_3$ is preferably set within the same range as the distance $l_1$ of the vacuum degassing apparatus 100B. By such a distance $l_3$, even if reboil bubbles form in the molten glass G on the upstream side with a depth $h_3$, the reboil bubbles formed on the upstream side can be removed before the molten glass G reaches the downstream side. Further, since the formula (2) is satisfied on the downstream side of the glass flow passage $3R_4$, formation of reboil bubbles on the downstream side can effectively be suppressed. That is, since the pressure in a region deeper than De on the downstream side is higher than the pressure $P_{abs}$ at the bottom portion $3R_d$ (that is, the degree of vacuum is lower), reboiling will not occur downstream this region.

The dimensions of the respective constituents for the vacuum degassing apparatus 100D according to this embodiment may properly be selected, and for example, they can be set in the same manner as the vacuum degassing apparatus 100.

The difference between the depth $h_3$ on the upstream side and the depth De on the downstream side of the molten glass G may properly be adjusted. For example, the depth De may be set deeper by about 1 m than the depth $h_3$.

Further, the connection wall $6a_3$ forming the downwardly constricted glass flow passage 6R above the downfalling pipe 6D is formed by a slope $6K_1$ on the upstream side and a slope $6K_2$ on the downstream side. The angles of slope relative to the horizontal direction and the dimensions such as the length in a horizontal direction of the slopes $6K_1$ and $6K_2$ may properly be adjusted. In the vacuum degassing apparatus 100D shown in FIG. 5, an example is shown wherein the horizontal length of the slope $6K_1$ on the upstream side is longer than the horizontal length of the slope $6K_2$ on the downstream side. This is an example wherein the angle of slope of the slope $6K_1$ relative to the horizontal direction is smaller than the angle of slope of the slope $6K_2$ relative to the horizontal direction, however, the vacuum degassing apparatus of the present invention is not limited thereto. The angles of slope and the dimensions of the slopes $6K_1$ and $6K_2$ may be the same or different, and may properly be adjusted.

An apparatus for producing molten glass according to the present invention is an apparatus comprising the above-described vacuum degassing apparatus 100 (or any one of 100B to 100D) and a melting device to melt glass materials to produce molten glass, disposed upstream the vacuum degassing apparatus 100. The melting device is within the range of publicly known technique. For example, by the melting device, glass materials adjusted to have a desired composition are charged into a melting tank and heated to a predetermined temperature in accordance with the type of glass, for example, from about 1,400 to about 1,600° C. in the case of silicate glass for building or for vehicles, to melt the glass materials thereby to obtain molten glass.

An apparatus for producing a glass product according to the present invention is an apparatus comprising the above-described apparatus for producing molten glass, a forming device (forming apparatus) 200 to form the molten glass disposed downstream the apparatus for producing molten glass, and an annealing device to anneal the glass after formed. The forming device and the annealing device are within the range of publicly known technique. As a forming device, a forming apparatus e.g. by a float process, a fusion method or a down draw method may be mentioned.

Among them, a forming device employing a float bath for a float process is preferred from a reason such that mass production of high quality plate glass in a wide range of thickness from thin plate glass to thick plate glass is possible. For example, as an annealing device, an annealing furnace equipped with a mechanism to gradually lower the temperature of the glass after formed is commonly employed. By the mechanism to gradually lower the temperature, heat, the output power of which is controlled by combustion gas or an electric heater, is supplied to a necessary position in a furnace to anneal glass after formed, whereby residual stress in glass after formed can be eliminated.

Figure 6:
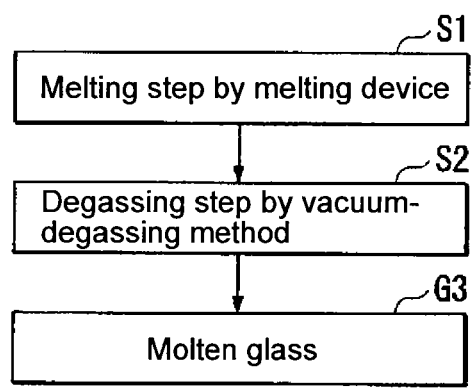
FIG. 6 is a flow chart illustrating an example of the process for producing molten glass according to the present invention.

Now, a process for producing molten glass according to the present invention will be described. FIG. 6 is a flow chart illustrating an embodiment of the process for producing molten glass of the present invention.

The process for producing molten glass of the present invention comprises the method for vacuum-degassing molten glass of the present invention. As an example, it is a process for producing molten glass, which comprises a melting step S1 of melting glass materials by the melting device at a stage prior to the vacuum degassing apparatus 100 to produce molten glass, a degassing step S2 of degassing molten glass by the above-described method for vacuum degassing molten glass, to obtain molten glass G3.

The process for producing molten glass of the present invention is within the range of publicly known technique except that the above-described method for vacuum-degassing molten glass is employed. Further, the apparatus utilized in the process for producing a glass product of the present invention is as described above.

Figure 7:
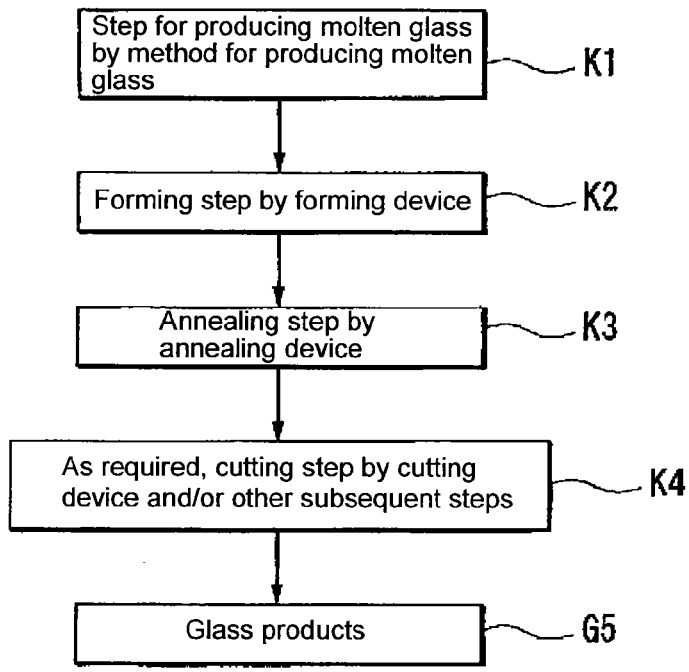
FIG. 7 is a flow chart illustrating an example of the process for producing a glass product according to the present invention.

Now, a process for producing a glass product of the present invention will be described. FIG. 7 is a flow chart illustrating an embodiment of the process for producing a glass product of the present invention.

The process for producing a glass product of the present invention is characterized by employing the above-described process for producing molten glass. The process for producing a glass product of the present invention comprises a step K1 for producing molten glass by the above-described process for producing molten glass, a forming step K2 of forming the molten glass downstream the step K1 for producing molten glass, and an annealing step K3 of annealing the molten glass in a subsequent step, to obtain a glass product G5. As shown in FIG. 7, and as the case requires, the process may have a cutting step of cutting the glass after annealed and/or other subsequent steps K4.

The process for producing a glass product of the present invention is within the range of publicly known technique except that the above-described process for producing molten glass is used. Further, the apparatus employed in the process for producing a glass product of the present invention is as described above. In FIG. 7, in addition to the melting step, the forming step and the annealing step as constituents for the process for producing a glass product of the present invention, a cutting step and another subsequent step carried out as the case requires are also shown.

EXAMPLES

Now, the present invention will be described in further detail with reference to Examples. However, it should be understood that the present invention is by no means restricted to the following Examples.

Example 1

To reproduce an atmosphere in which vacuum-degassing is carried out, each of glasses as identified in Tables 1 and 2 was melted in a platinum crucible, and the resulting molten glass was transferred into a crucible made of alumina electrocast refractories (manufactured by AGC CERAMICS CO., LTD., "MB-G", tradename, $Al_2O_3$: 95 to 96 mass %, $Na_2O_3$: 3 mass %, slight amounts of $SiO_2$ and CaO contained) via a platinum passage, and the crucible made of alumina electrocast refractories in which the molten glass was put was disposed in a melting vacuum container. The respective components for the glass in Table 1 are represented by wt %, and values in brackets are represented by mol %. Here, the atmosphere including the crucible made of alumina electrocast refractories was heated to further melt the glass, and the temperature of the molten glass was adjusted to the temperature shown in Table 2. Then, under the absolute pressure of the molten glass at the bottom portion in the vacuum container being the pressure $P_{abs}$ (kPa) as shown in Table 2, vacuum-degassing treatment was carried out. Bubbles floating from the molten glass in such a state were imaged by a CCD camera through an observation hole provided on the upper portion of the crucible made of alumina electrocast refractories, and the number of bubbles having diameters of 0.5 mm or larger were measured to determine the frequency of reboiling (bubbles/$cm^2$/h) of the molten glass. In the test, the degree of vacuum was maintained by melting in the crucible made of alumina electrocast refractories. Further, observation of the bubbles was conducted after a lapse of 3 days from initiation of melting. This is because bubbles regardless of the test conditions form from the furnace material at the initial stage of the test.

The results are shown in Table 2. The glasses A1 to A8 shown in the column of glass type in Table 2 are glass A in Table 1, glasses B1 to B6 are glass B in Table 1, glasses C1 to C6 are glass C in Table 1, and glasses D1 to D6 are glass D in Table 1. Further, in FIG. 8, the relation between the $SO_2$ supersaturation degrees SS of the respective molten glasses and the frequency of reboiling is shown.

The characteristic values in Table 2 were measured by the following method.

Measurement of the $SO_3$ concentration [$SO_3$] was carried out by a fluorescent X-ray analyzer using a sample obtained by pulverizing a plate-shape sample obtained by cooling the molten glass. $pO_2$ in the molten glass was measured by re-melting the plate-shape sample obtained by cooling the molten glass in an experimental furnace. The experimental furnace used for measurement was $pO_2$ measuring apparatus Rapidox (manufactured by Heraeus Electro-Nite). The measurement procedure is as follows. Seven hundred grams of a plate-shape sample was put in a dedicated crucible made of sintered quartz and re-melted at 1,400° C. The temperature was lowered to 1,300° C., and an oxygen sensor probe (reference material Ni/NiO) employing zirconia solid electrolyte was inserted into the matrix, and measuring was carried out sequentially lowering the temperature to 1,250° C. and 1,200° C. In order to cancel out the influence of electrolysis which slightly occurred around the measurement electrode, the crucible was rotated at 4 rpm.

$pSO_2$ in the molten glass was calculated from the above formula (7). Here, as the pseudo equilibrium constant K', a value calculated from the formula (11) determined by the following method was employed. The pseudo equilibrium constant K' can be strictly evaluated as a function of the temperature by measuring the $SO_3$ concentration in equilibrium with known $pSO_2$ and $pO_2$ at the respective temperatures. For evaluation of the pseudo equilibrium constant K', glass having a model composition comprising 71.5 mass % of $SiO_2$, 1.5 mass % of $Al_2O_3$, 13.5 mass % of $Na_2O$, 0.5 mass % of $K_2O$, 4.5 mass % of MgO and 8.5 mass % of CaO, which is a simulation of the molten glass to be used for the vacuum degassing method of the present invention, was employed. This glass is put in a test tube made of quartz glass and housed in an electric furnace maintained at a predetermined temperature T and re-melted, and a mixed gas of $SO_2$, $O_2$ and Ar adjusted to have predetermined $SO_2$ partial pressure ($=pSO_2^{bub}$) and $O_2$ partial pressure ($=pO_2^{bub}$) is introduced by bubbling thereinto through a quartz glass tube inserted to the molten glass. After completion of bubbling for a predetermined time, the quartz glass tube was immediately withdrawn, and the test tube made of quartz glass is taken out from the electric furnace and quickly cooled by running water to obtain a glass piece. On that occasion, it should be confirmed that a sulfate is not floating as galls. If galls of a sulfate are present in the molten glass, it is necessary to increase the Ar partial pressure of the mixed gas to be introduced to lower $pSO_2^{bub}$ and $pO_2^{bub}$. The glass piece thus obtained is pulverized, and the $SO_3$ concentration in the glass piece is measured by a fluorescent X-ray analyzer. Glass pieces differing in the bubbling time at each predetermined temperature are prepared, and a constant $SO_3$ concentration or the maximum $SO_3$ concentration in the glass piece relative to the bubbling time is read. This $SO_3$ concentration is regarded as the $SO_3$ concentration $[SO_3]_{eq}^{bub}$ in the molten glass in equilibrium with $pSO_2^{bub}$ and $pO_2^{bub}$ at the temperature T, and the pseudo equilibrium constant K' is determined by the following formula:

$$K'(T) = \frac{pSO_2^{bub} \times \sqrt{pO_2^{bub}}}{[SO_3]_{eq}^{bub}} \tag{11}$$

The present inventors have conducted the above experiment at a temperature T within a range of from 1,250 to 1,500° C., and the pseudo equilibrium constant K' at an optional temperature T (K) was determined as follows:

$$\log K'(T) = 17.258 - 1705/T \tag{12}$$

TABLE 1

| Mass % (mol %) | Glass A | Glass B | Glass C | Glass D |
|---|---|---|---|---|
| $SiO_2$ | 71.27 (70.29) | 70.84 (70.03) | 69.49 (69.65) | 69.99 (69.49) |
| $Al_2O_3$ | 1.88 (1.09) | 1.56 (0.91) | 1.69 (1.00) | 1.80 (1.05) |
| $Na_2O$ | 13.29 (12.71) | 13.37 (12.82) | 13.50 (13.11) | 13.32 (12.82) |
| $K_2O$ | 0.63 (0.40) | 0.50 (0.32) | 0.59 (0.38) | 0.85 (0.54) |
| MgO | 4.68 (6.88) | 4.31 (6.35) | 4.03 (6.02) | 4.65 (6.88) |
| CaO | 8.04 (8.50) | 8.57 (9.08) | 8.15 (8.76) | 8.26 (8.79) |
| $TiO_2$ | 0.12 (0.09) | 0.50 (0.37) | 0.42 (0.32) | 0.02 (0.01) |
| $Fe_2O_3$ | 0.08 (0.03) | 0.34 (0.13) | 0.61 (0.23) | 1.10 (0.41) |
| $CeO_2$ | 0.00 | 0.00 | 1.52 (0.53) | 0.00 |
| Alkali oxide plus alkaline earth oxide | (28.49) | (28.57) | (28.27) | (29.03) |

TABLE 1-continued

| Mass % (mol %) | Glass A | Glass B | Glass C | Glass D |
|---|---|---|---|---|
| Se (mass ppm) | 0 | 0 | 0 | 30 |
| CoO (mass ppm) | 0 | 0 | 0 | 244 |
| $Cr_2O_3$ (mass ppm) | 0 | 0 | 0 | 63 |
| $SnO_2$ (mass ppm) | 0 | 70 | 70 | 70 |

TABLE 2

| Glass type | Molten glass temperature (°C.) | $P_{abs}$ (kPa) | $[SO_3]$ (wt %) | $log pO_2$ (kPa) | $pSO_2$ (kPa) | $SO_2$ supersaturation degree SS | Frequency of reboiling (bubbles/$cm^2$/h) |
|---|---|---|---|---|---|---|---|
| A1 | 1,300 | 8.0 | 0.06 | −1.49 | 27.6 | 3.5 | 24.0 |
| A2 | 1,300 | 8.0 | 0.078 | −1.69 | 45.2 | 5.7 | 26.5 |
| A3 | 1,300 | 13.3 | 0.078 | −1.69 | 45.2 | 3.4 | 5.9 |
| A4 | 1,300 | 21.3 | 0.078 | −1.69 | 45.2 | 2.1 | 1.5 |
| A5 | 1,300 | 8.0 | 0.17 | −1.09 | 49.4 | 6.2 | 33.8 |
| A6 | 1,300 | 21.3 | 0.17 | −1.09 | 49.4 | 2.3 | 13.2 |
| A7 | 1,200 | 8.0 | 0.078 | −2.75 | 28.1 | 3.5 | 2.9 |
| A8 | 1,200 | 21.3 | 0.078 | −2.75 | 28.1 | 1.3 | 0.0 |
| B1 | 1,300 | 8.0 | 0.032 | −2.71 | 60.0 | 7.5 | 5.9 |
| B2 | 1,300 | 8.0 | 0.043 | −2.33 | 52.1 | 6.5 | 20.6 |
| B3 | 1,300 | 14.7 | 0.043 | −2.33 | 52.1 | 3.6 | 1.5 |
| B4 | 1,300 | 8.0 | 0.062 | −1.89 | 45.2 | 5.7 | 11.8 |
| B5 | 1,200 | 8.0 | 0.043 | −3.46 | 35.1 | 4.4 | 0.0 |
| B6 | 1,200 | 21.3 | 0.043 | −3.46 | 35.1 | 1.6 | 0.0 |
| C1 | 1,300 | 8.0 | 0.024 | −3.08 | 68.9 | 8.6 | 7.4 |
| C2 | 1,300 | 8.0 | 0.062 | −1.74 | 38.1 | 4.8 | 7.4 |
| C3 | 1,200 | 8.0 | 0.024 | −4.19 | 45.4 | 5.7 | 1.5 |
| C4 | 1,200 | 8.0 | 0.062 | −2.81 | 24.0 | 3.0 | 1.5 |
| C5 | 1,200 | 15.3 | 0.062 | −2.81 | 24.0 | 1.6 | 1.5 |
| C6 | 1,200 | 21.3 | 0.062 | −2.81 | 24.0 | 1.1 | 1.5 |
| D1 | 1,300 | 8.0 | 0.168 | −0.53 | 25.6 | 3.2 | 29.4 |
| D2 | 1,300 | 8.0 | 0.187 | −0.64 | 32.4 | 4.0 | 23.6 |
| D3 | 1,300 | 14.7 | 0.187 | −0.64 | 32.4 | 2.2 | 19.1 |
| D4 | 1,300 | 21.3 | 0.187 | −0.64 | 32.4 | 1.5 | 1.5 |
| D5 | 1,200 | 21.3 | 0.168 | −1.70 | 18.1 | 0.8 | 0.0 |
| D6 | 1,200 | 21.3 | 0.187 | −1.75 | 21.3 | 1.0 | 0.0 |

As evident from the results in Table 2 and FIG. 8, in a case where $pSO_2/P_{abs}$ as the $SO_2$ supersaturation degree SS, is at least 2.0, the frequency of reboiling exceeds 10 bubbles/$cm^2$/h and is high, and the effects of the present invention will not be achieved in some cases. The results of the frequency of reboiling being 0 bubbles/$cm^2$/h at SS of substantially 1 verifies the effectiveness of the results of this experiment.

Example 2

To reproduce the atmosphere in which vacuum-degassing is carried out, glasses differing in the moisture concentration as identified in Tables 1 and 2 were put in the above-described apparatus, and the experiment of vacuum-degassing treatment was carried out. The crucible was heated to melt each glass, and the temperature of the molten glass in the crucible made of alumina electrocast refractories was adjusted to the temperature as shown in Table 3. The absolute pressure $P_{abs}$ of the molten glass at the bottom portion of the crucible was adjusted to the value as shown in Table 3, and bubbles in the molten glass were imaged by a CCD camera from an observation hole provided on the vacuum degassing apparatus, and the number of bubbles having diameters of 0.5 mm or longer were measured to determine the frequency of reboiling (bubbles/$cm^2$/h). The results are shown in Table 3 and FIG. 9. The glasses A1 to A8 shown in the column of glass type in Table 3 are glass A in Table 1.

The characteristic values in Table 3 were measured by the following method. To measure β-OH (1/mm) as an index of the moisture concentration in the molten glass, both surfaces of a glass piece obtained by quenching and solidifying the molten glass were mirror-polished into a parallel plate having a thickness of t (mm), which was used as a sample. β-OH can be obtained by measuring the infrared absorption spectrum of the parallel plate, reading the transmittance $T_{4000}$ at 4,000 $cm^{-1}$ and the minimum transmittance $T_{3500}$ in the vicinity of 3,500 $cm^{-1}$ and substituting them in the following formula:

$$\beta\text{-OH} = \log(T_{4000}/T_{3500})/t \tag{13}$$

$pH_2O$ (Pa) as the $H_2O$ partial pressure in the molten glass can be determined by the following formula:

$$pH_2O = K_W \times (\beta\text{-OH})^2 \tag{14}$$

$K_w$ is a value determined based on the moisture solubility data of conventional soda lime glass as disclosed in a literature (High Temperature Glass Melt Property Database for Process Modeling, Edited by T. P. Seward III and T. Vascott, Wiley-American Ceramic Society), and values of $2.70 \times 10^5$ at 1,300° C. and $2.66 \times 10^5$ at 1,200° C. were employed.

FIG. 9 is a graph obtained by plotting the $H_2O$ supersaturation degree SH in the molten glass and the frequency of reboiling. As described above, no correlation between the $H_2O$ supersaturation degree SH in the molten glass and the frequency of reboil bubbles, as between the $SO_2$ supersaturation degree SS and the frequency of reboiling, was confirmed.

TABLE 3

| Glass type | Molten glass temperature (° C.) | $P_{abs}$ (kPa) | β-OH (1/mm) | $pH_2O$ (kPa) | $H_2O$ super-saturation degree SH | Frequency of reboiling (bubbles/cm²/h) |
|---|---|---|---|---|---|---|
| A1 | 1,300 | 8.0 | 0.160 | 6.9 | 0.9 | 24.0 |
| A2 | 1,300 | 8.0 | 0.284 | 21.8 | 2.7 | 26.5 |
| A3 | 1,300 | 13.3 | 0.284 | 21.8 | 1.6 | 5.9 |
| A4 | 1,300 | 21.3 | 0.284 | 21.8 | 1.0 | 1.5 |
| A5 | 1,300 | 8.0 | 0.180 | 8.7 | 1.1 | 33.8 |
| A6 | 1,300 | 21.3 | 0.180 | 8.7 | 0.4 | 13.2 |
| A7 | 1,200 | 8.0 | 0.284 | 21.4 | 2.7 | 2.9 |
| A8 | 1,200 | 21.3 | 0.284 | 21.4 | 1.0 | 0.0 |

Example 3

The same test as in Example 1 was carried out with respect to glass composition B in Table 1 except that the crucible made of alumina electrocast refractories into which the molten glass was put at the time of the vacuum-degassing treatment was changed to a crucible made of platinum. The results are shown in Table 4. From the results, it was found that reboil bubbles are less likely to form in a case where the crucible into which the molten glass was put was made of platinum, as compared with the case of the alumina electrocast refractories. Further, it was found that in a case where the crucible into which the molten glass was put was made of platinum, molten glass with good bubble quality can be produced by adjusting the $SO_2$ supersaturation degree SS to about 4.3.

The glasses B7 and B8 shown in the column of glass type in Table 4 are glass B in Table 1.

TABLE 4

| Glass type | Molten glass temperature (° C.) | $P_{abs}$ (kPa) | $[SO_3]$ (wt %) | $\log pO_2$ (kPa) | $pSO_2$ (kPa) | $SO_2$ super-saturation degree SS | Frequency of reboiling (bubbles/cm²/h) |
|---|---|---|---|---|---|---|---|
| B7 | 1,300 | 17.3 | 0.148 | −0.96 | 36.7 | 2.1 | 0.0 |
| B8 | 1,220 | 8.0 | 0.043 | −3.14 | 34.4 | 4.3 | 0.0 |

INDUSTRIAL APPLICABILITY

The method for vacuum-degassing molten glass, the apparatus for vacuum-degassing molten glass, the process for producing molten glass, the apparatus for producing molten glass, the process for producing a glass product and the apparatus for producing a glass product of the present invention are applicable to production of a variety of glass products for building, for vehicles, for optical use, for medical use and for other uses.

This application is a continuation of PCT Application No. PCT/JP2012/059734, filed on Apr. 9, 2012, which is based upon and claims the benefit of priority from Japanese Patent Application No. 2011-088174 filed on Apr. 12, 2011. The contents of those applications are incorporated herein by reference in its entirety.

REFERENCE SYMBOLS

1: Melting tank, 2: vacuum housing, 3, 3B, 3C, 3D: vacuum degassing vessel, 3R, 3R₂, 3R₃ and 3R₄: glass flow passage, 4: heat-insulating material, 5: uprising pipe (supply mechanism), 6, 6D: downfalling pipe (sending mechanism), 6a₃: connection wall, 11: conducting pipe, 12: upstream pit, 13: downstream pit, 100, 100B, 100C, 100D: vacuum degassing apparatus, 200: forming apparatus, G: molten glass

What is claimed is:

1. A method, comprising:
    passing a molten silicate glass through a glass flow passage in a vacuum degassing vessel, the interior of which is maintained in a reduced pressure state, to vacuum-degas the molten glass, the molten silicate glass comprising a refining agent containing S (sulfur) element, an amount of the refining agent in the molten silicate glass being 0.043 weight % or more as calculated as $SO_3$;
    wherein vacuum-degassing of the molten glass is carried out under conditions satisfying formula (1) at least at a bottom portion on a downstream side of the glass flow passage of the vacuum degassing vessel, such that formation of bubbles at an interface between furnace material of the vacuum degassing vessel and the molten silicate glass is suppressed:

$$SS = pSO_2/P_{abs} < 2.0 \quad (1)$$

wherein:
    SS is a supersaturation degree of $SO_2$ in the molten glass;
    $pSO_2$ is a partial pressure (Pa) of $SO_2$ in the molten glass; and
    $P_{abs}$ is a pressure (Pa) at the bottom portion of the glass flow passage of the vacuum degassing vessel.

2. The method according to claim 1, wherein the silicate glass has a composition of $SiO_2 \geq 50$ mol% and (alkali component oxide plus alkaline earth component oxide)$\geq 10$ mol%.

3. The method according to claim 1, wherein the conditions satisfying formula (1) exist between a downstream end of the glass flow passage and a location L/2 from the downstream end of the glass flow passage, wherein L is a length of the glass flow passage in a horizontal direction.

4. A process, comprising:
    melting glass materials to obtain a molten silicate glass which comprises a refining agent containing S (sulfur) element, an amount of the refining agent in the molten silicate glass being 0.043 weight % or more as calculated as $SO_3$; and
    passing the molten silicate glass through a glass flow passage in a vacuum degassing vessel, the interior of which is maintained in a reduced pressure state, to vacuum-degas the molten glass;
    wherein vacuum-degassing of the molten glass is carried out under conditions satisfying formula (1) at least at a bottom portion on a downstream side of the glass flow passage of the vacuum degassing vessel, such that formation of bubbles at an interface between furnace material of the vacuum degassing vessel and the molten silicate glass is suppressed:

$$SS = pSO_2/P_{abs} < 2.0 \quad (1)$$

wherein:
SS is a supersaturation degree of $SO_2$ in the molten glass;
$pSO_2$ is a partial pressure (Pa) of $SO_2$ in the molten glass; and
$P_{abs}$ is a pressure (Pa) at the bottom portion of the glass flow passage of the vacuum degassing vessel.

5. The process according to claim 4, wherein the silicate glass has a composition of $SiO_2 \geq 50$ mol% and (alkali component oxide plus alkaline earth component oxide)$\geq 10$ mol%.

6. The process according to claim 4, wherein the conditions satisfying formula (1) exist between a downstream end of the glass flow passage and a location L/2 from the downstream end of the glass flow passage, wherein L is a length of the glass flow passage in a horizontal direction.

7. A process, comprising:
melting glass materials to obtain a molten silicate glass which comprises a refining agent containing S (sulfur) element, an amount of the refining agent in the molten silicate glass being 0.043 weight % or more as calculated as $SO_3$;
passing the molten silicate glass through a glass flow passage in a vacuum degassing vessel, the interior of which is maintained in a reduced pressure state, to vacuum-degas the molten glass;
forming the vacuum-degassed molten glass in to a formed glass; and
annealing the formed glass;
wherein vacuum-degassing of the molten glass is carried out under conditions satisfying formula (1) at least at a bottom portion on a downstream side of the glass flow passage of the vacuum degassing vessel, such that formation of bubbles at an interface between furnace material of the vacuum degassing vessel and the molten silicate glass is suppressed:

$$SS = pSO_2/P_{abs} < 2.0 \qquad (1)$$

wherein:
SS is a supersaturation degree of $SO_2$ in the molten glass;
$pSO_2$ is a partial pressure (Pa) of $SO_2$ in the molten glass; and
$P_{abs}$ is a pressure (Pa) at the bottom portion of the glass flow passage of the vacuum degassing vessel.

8. The process according to claim 7, wherein the silicate glass has a composition of $SiO_2 \geq 50$ mol% and (alkali component oxide plus alkaline earth component oxide)$\geq 10$ mol%.

9. The process according to claim 7, wherein the conditions satisfying formula (1) exist between a downstream end of the glass flow passage and a location L/2 from the downstream end of the glass flow passage, wherein L is a length of the glass flow passage in a horizontal direction.

* * * * *